Patented Oct. 23, 1934

1,978,297

UNITED STATES PATENT OFFICE 1,978,297

TESTICULAR HORMONE AND METHOD OF PRODUCING THE SAME

Frank R. Eldred, Jersey City, N. J., assignor to Reed & Carnrick, Jersey City, N. J., a corporation of New Jersey No Drawing. Application August 17, 1927, Serial No. 213,694

10 Claims. (Cl. 167—74)

This invention relates to the commercial production of a testicular hormone and to the method of extracting and purifying the same and to the resulting product.

It is an object of the present invention to produce a testicular hormone having all the desired activity of the natural gland by a process adapted for quantity production of the product on a commercial scale and at a comparatively low cost.

Another object of the invention is to provide the hormone in an active state as a product of manufacture for use either by injection or oral administration.

Another object of the invention is to provide as a product of manufacture for therapeutic uses a combination of a testicular hormone with the extract or hormone of other related glands with or without drugs to produce a balanced therapeutic compound.

Another object of the invention is to provide an active testicular hormone in an aqueous or saline solution and to provide an efficient method for extracting said hormone from the animal gland and purifying said extract and rendering the same soluble in water.

It will be understood that the method which I propose to use may be varied in many details to commercially produce the hormone and that the hormone may be variously combined with other medicinal products than those specifically mentioned below to provide various correlated activity on the human body.

In general, my process comprises extracting the major portion of the testicular hormone from the minced glands by the use of solvents which, while removing substantially all the hormone, will dissolve as little as possible of the phosphatids, fats, cholesterol and other inert or toxic materials from the glands, and the subsequent removal of the hormone from this original extract containing also some phosphatids, fats, cholesterol, etc.

I prefer to prepare my extract from fresh whole testicles because of the greater probability of securing the entire active principles of the gland therefrom, although selected portions of these glands may be used.

In preparing my product, I first grind the fresh testicles and mix the same with about three times their weight of an organic solvent capable of extracting the hormone. The amount of the solvent is preferably proportioned to the amount of water in the fresh glands so as to produce a concentration of the solvent which will extract the greatest amount of the physiologically active lipoid material and the least amount of the fats, protein, phospholipins cholesterol and other physiologically inert substances. For example, when acetone is used for the original extraction it is desirable to use about four volumes because this, when mixed with the normal water constituent of the glands, produces approximately a ninety (90) per cent. acetone which I have found to be the most efficient acetone concentration for my purpose. When propyl alcohol is used, a final concentration of about seventy (70) per cent. dissolves out the largest amount of the active substance with the least amount of inert material and I therefore prefer to start the extraction with about two volumes of propyl alcohol. With ethyl and methyl alcohol, a somewhat higher final concentration is desired for the first extraction and I have found that about three volumes of ninety-five (95) per cent. alcohol are required, giving a final concentration after mixing with the water of the glands of about seventy-five (75) per cent. It will be understood that the amount of water in the fresh gland is not constant, and that the final concentration of the solvent may therefore vary slightly from the exact figures given, and that these figures are to indicate approximately the best working conditions rather than to give mathematically exact concentrations.

I have found that most, if not all, of the physiologically active material is associated with the lipoid material of these glands and it is my purpose in this first extraction step to use a solvent which will dissolve out the greatest portion of the lipoid material excluding as far as possible all inert substances.

The ground whole testicles are preferably macerated from twelve to forty-eight hours with the required amount of the solvent selected, the liquid is filtered off, the residue expressed and re-extracted with preferably the same solvent, this time (the glands having been freed from the water therein) using the exact concentration which recovers most of the hormone with the least undesired material, as, for example, ninety (90) per cent. acetone, seventy (70) per cent. propyl alcohol or about seventy-five (75) per cent. ethyl or methyl alcohol, etc. Extraction is continued until the residue is fully extracted. The extracts are combined, and the solvent distilled off at a low temperature and under reduced pressure. All traces of the solvent are removed, leaving the lipoid material containing the hormone, together with other substances emulsified in an aqueous solution.

My next step is designed to extract from this aqueous solution the active principles or hormones leaving therein substantially all of the cholesterol, phospholipins and inert or toxic matter and this may be accomplished by agitating the emulsion with an ester or other solvent for the hormone, such as chloroform amyl or butyl alcohol, amyl butyl or ethyl acetate, etc., which has the property of dissolving out the hormone, and rejecting the inactive materials.

The mixture resulting from the agitation of the emulsified aqueous solution of the lipoid material with one of the solvents named above, when the agitation has ceased, separates into two or three layers, dependent upon the solvent used. When three layers are formed, the upper or solvent layer contains the active lipoid with possible traces of cholesterol and phospholipins, and is free from protein, the middle layer contains most of the phospholipins and cholesterol present in the original extract, together with other organic material, and a portion of the solvent and water. The lower aqueous layer contains blood pigments, salts, etc. The one or two lower layers are preferably drawn off and the agitation with the hormone solvent repeated several times and finally the two or three layers are drawn off separately. In case chloroform is used the lower chloroform layer contains the active hormones.

The combined upper layers may then be washed with a one (1) to ten (10) per cent sodium carbonate solution to remove all traces of the fatty acids and phospholipins, washed with water to remove the sodium carbonate and the solvent distilled off. The residue then contains the testicular hormone in a high state of purity.

For example, in using amyl alcohol at this step of the process, the agitated mixture of the amyl alcohol and the aqueous solution containing the lipoid material separates into three layers, with the upper layer containing the active portion or hormone. The two lower layers are then drawn off, the agitation with amyl alcohol repeated and the upper layers resulting from several repetitions of this step combined, washed with a one (1) to ten (10) per cent. sodium carbonate solution and then with water and the solvent distilled off leaving the hormone in a high state of purity.

If desired, the aqueous mixture containing the hormone may be rendered very slightly alkaline before extracting the hormone from it, and the step of washing with sodium carbonate omitted. The hormone may be dried carefully at this point and made into tablets for oral administration or compounded with other related therapeutic substances into tablets or suspended in a suitable carrier for injections.

The active testicular hormone at this stage of the process is light yellow in color and at room temperature is of a soft waxy consistency. It does not give the biuret test, but gives a positive cholesterol reaction. It is in a comparatively high state of purity and is, therefore, highly concentrated, more active and less toxic than gland extracts heretofore produced. When dissolved in oil or aqueous solutions and injected into castrated or immature male rats, it produces a marked increase of activity in the animals and if the injections are continued over a long period of time, changes in secondary sex characteristics which normally occur in castrated animals are prevented. The same results are produced by feeding the hormone in sufficient doses over a long period of time. When administered to young male rats, either by feeding or injection, the growth of the genital organs is greatly increased and if administered to old animals the sexual activity is markedly increased.

To prepare the hormone for human use by injection, it is preferable to further purify the light yellow waxy or oily material and bring the active portion thereof into an aqueous or saline solution which can be used for frequent injection without the irritation accompanying the frequent injection of materials dissolved in oil. I therefore dissolve the yellow waxy substance in methyl or ethyl alcohol in the proportion of 10 grams of the substance to 10 cc. of alcohol. A portion of the cholesterol remains undissolved and the mixture is then chilled by suitable refrigeration which causes a further separation of cholesterol and some other contaminating materials which may be removed by filtration. The alcohol is then distilled from the filtrate and the residue dissolved in ether, benzene or other suitable solvent and agitated with a 2 to 10% solution of sodium or potassium hydroxide, which saponifies the fats and oils present. The mixture separates into two layers. The upper or ethereal layer contains the active hormone and the lower or aqueous layer contains the saponified fats, oils, etc. The upper ether layer is separated from the lower layer and the step of saponification is repeated. The combined lower layers containing the saponified fats are collected together and re-extracted with ether or other suitable solvent to remove as much as possible of the hormone and the combined ethereal layers washed with from four to five portions of water to remove all traces of soap and alkali from the same. The ether or other solvent is then distilled off, leaving the hormone freed from a substantial portion of the cholesterol and oil originally contained therewith. The residue, after the evaporation of the solvent, is again dissolved in methyl alcohol in the proportion of 150 cc. of the methyl alcohol to 10 grams of original material and 10 cc. of normal hydrochloric acid added to produce a slightly acid solution. This alcoholic solution is then washed with petroleum ether, which removes further portions of cholesterol and other impurities, such as the coloring material, leaving a clear faintly colored solution. The petroleum ether solution is re-extracted with a further portion of acidulated methyl alcohol and the combined alcohol solutions are nearly neutralized by adding an amount of normal sodium hydroxide equivalent to the amount of hydrochloric acid used. The alcohol is evaporated and the residue containing the active principle of the hormone is agitated with neutral or faintly acidulated water or with a physiological saline solution which dissolves the hormone to provide an active aqueous hormone solution. To get an even higher degree of purity, instead of neutralizing the alcoholic solution and distilling off the alcohol after the first washing with petroleum ether, the solution may be further diluted with from 10 cc. to 20 cc. of water and again washed with petroleum ether before neutralizing distilling off the alcohol and dissolving the residue in water.

The solution of the testicular hormone is clear and colorless as water and has no visible solids therein, it is free from cholesterol and protein and can be sterilized by boiling or by heating in an autoclave at 10 to 15 lbs. pressure without destroying the activity. Filtration of the solution through a Berkefeld filter causes it to lose its activity and filtration through paper filters must be carried out with careful control of the H-ion concentration, maintaining a pH value near 5.0 to prevent loss of activity. Its physiologic activity is such that 1 cc. or less of the aqueous testicular solution when injected into castrated or immature male rats will produce marked increase of physical activity and if the injections are continued, will prevent changes in secondary sex characteristics which normally occur in castrated animals.

It is desirable during all of the steps above outlined to protect the hormone from oxidation, which may be done by carrying out the various steps in the presence of carbon dioxide, nitrogen or other non-oxidizing gas.

In lieu of a high concentration of the initial solvent, which is diluted by the water in the fresh glands, the freshly ground glands may be dried in a vacuum to remove the water and the extraction started with that concentration of the solvent which is most efficient on the dry glands.

As an alternative process the fresh or desiccated glands may be extracted with acidulated water or the desiccated glands may be extracted with acidulated alcohol. If acidulated water is used in the extraction, the extract may be purified by evaporating in vacuo to a small volume and then precipitating by the addition of three or more volumes of alcohol.

The testicular hormone is especially recommended for treatment and relief of symptoms accompanying castration, for dysfunctions of the testicles, for decreased sexual powers, relief of the male climacteric, general debility in the aged, etc. It is effective either when administered by injection or orally.

The testicular hormone may be used alone or combined with hormones or other medicinals having a related effect on the same or related organs of the body to produce a complete and balanced action or stimulation of these parts of the body.

Inasmuch as the dysfunction of the testicles and genital organs is often either caused by or accompanied by improper functioning and deficiencies of other organs and parts of the body, it is desirable in some instances, in order to effect complete restoration of normal bodily functions, to combine with the testicular hormone, other medicinals having a related effect on the same glands or a related effect on related organs of the body to produce a complete and balanced action or stimulation of these parts. It will be understood that various combinations serving varied therapeutic ends may be made. I have found, however, due to the interrelation of the male genital organs and the prostate gland, that combinations of the testicular hormone and the prostatic hormone or extract produce in most instances a more desirable reaction than the administration of the testicular hormone alone. Also that the dysfunctions or deficiencies of the testicles often result in deficiency or lowering of the phosphorus content of the body, so that for complete restoration of normal activity, the administration of the testicular hormone should be accompanied with an administration of phosphorus in suitable organic combination to be taken up by the body. I, therefore, in some instances, compound the testicular hormone, purified as above, with the hormone of the prostate gland, preferably in amounts representing approximately ten parts of fresh testicle to one part of fresh prostate with variable amounts of phosphorus.

The relative proportions of the ingredients may, of course, be varied in special cases or to meet special conditions, and I consider it within the scope of my invention to use the testicular hormone alone or combined with the hormone of other related glands and substances in various proportions to get the balanced results desired from my product. The hormone of the prostate may be extracted and purified separately according to known methods or, by methods similar to those described herein.

It will be understood that various modifications and changes may be made in the steps or solvents or concentrations thereof used in my process or in the composition of the finally compounded product without departing from the spirit of my invention or the scope of the appended claims.

I claim:

1. The method of isolating and preparing hormones from testicles, which comprises extracting the fresh testicles with an alcoholic solvent proportioned to the water in the glands to produce a 70 to 75% concentration, repeating the extraction and combining the extracts, driving off the solvent, leaving the hormone suspended in an aqueous emulsion, agitating the emulsion with an alkyl acetate solvent to dissolve out the hormone while rejecting the inactive and toxic materials, washing the dissolved hormone with dilute sodium carbonate, driving off the solvent, drying the hormone and forming into tablets.

2. The method of isolating and preparing hormones from testicles, which comprises extracting the fresh testicles with an alcoholic solvent proportioned to the water content of the testicles to produce approximately a 75% concentration, repeating the extraction with a 75% alcohol, combining the extracts, evaporating the alcohol, agitating the residue with an alkyl acetate solvent which separates the hormone into layers, separating the upper layers, repeating the agitation as to the lower layers, combining the upper layers, washing the hormone suspended in said acetate solvent with dilute sodium carbonate, evaporating the solvent and preparing the hormone for medicinal use.

3. The method of isolating and preparing hormones from testicles, which comprises extracting the fresh testicles with an alcoholic solvent proportioned to the water content of the glands to produce approximately a 75% concentration, repeating the extraction with a 75% alcohol, combining the extracts evaporating the alcohol, agitating the residue with an ethyl acetate solvent which separates the mixture into layers, separating the upper layers containing the hormone, repeating the agitation as to the lower layers combining the upper layers, washing the hormone suspended in said acetate solvent with dilute alkali, evaporating the solvent and preparing the hormone for medicinal use.

4. The method of isolating and preparing hormones from testicles which comprises extracting the fresh testicles with an alcoholic solvent proportioned to the water in the testicles to produce a 70 to 75% concentration, repeating the extraction and combining the extracts, driving off the solvent, leaving the hormone suspended in an aqueous emulsion, agitating the emulsion with an alkyl acetate solvent to dissolve out the hormone while rejecting the inactive and toxic materials, washing the dissolved hormone with a dilute alkali driving off the solvent dissolving in alcohol, chilling, filtering, distilling off alcohol, redissolving in ether, removing the fats and oils by saponification, distilling off ether, dissolving in alcohol, removing remaining cholesterol, coloring matter and other impurities by washing with petroleum ether, removing alcohol and dissolving the purified hormone in physiologic saline.

5. The method of concentrating and purifying a testicular hormone which comprises removing the protein constituents from the testicular tissue, and extracting the testicular hormone from the residue at least once with a fat solvent, and removing the fat solvent.

6. The method as set forth in claim 5, in which the fat solvent is an immiscible liquid.

7. The method as set forth in claim 5, in which the fat solvent is benzene.

8. The method as set forth in claim 5, in which the concentrated testicular hormone is fractionated with an additional fat solvent.

9. A potent extract from a tissue constituent, containing the testicular hormone, said extract being of a concentration of the order of that obtained by treating testicular tissue with substantially pure ethyl alcohol to coagulate the proteins and render them insoluble, removing the liquid therefrom, concentrating said liquid to an aqueous lipoid sludge, treating said sludge at least once with a fat solvent, recovering the solute dissolved by the fat solvent and successively fractionating said solute with alcohol and benzene, said extract being sufficiently free from impurities for repeated administration to animals, and having the physiological properties of producing marked effect upon the secondary sex characteristics of castrated laboratory animals.

10. A clear aqueous solution of a testicular hormone, containing no visible solids and giving no cholesterol or protein reaction, and of such strength that 2 cc. or less will produce observable sex reactions in a castrated rat, and produced by extracting fresh testicle with a water miscible lipoid and hormone solvent, distilling the solvent leaving the hormone in an aqueous lipoid solution, extracting the hormone from the aqueous lipoid solution at least once with a water immiscible fat solvent, washing with dilute alkali, distilling off the fat solvent, redissolving in a water immiscible fat solvent and separating the hormone from the associated fats and oils by saponification, removing the solvent and dissolving the hormone in water for injection.

FRANK R. ELDRED.

CERTIFICATE OF CORRECTION.

Patent No. 1,978,297.

October 23, 1934.

FRANK R. ELDRED.

It is hereby certified that error appears in the printed specification of the above numbered patent requiring correction as follows: Page 2, line 90, for "10" read 100; and that the said Letters Patent should be read with this correction therein that the same may conform to the record of the case in the Patent Office.

Signed and sealed this 12th day of March, A. D. 1935.

Leslie Frazer (Seal)

Acting Commissioner of Patents.

by saponification, distilling off ether, dissolving in alcohol, removing remaining cholesterol, coloring matter and other impurities by washing with petroleum ether, removing alcohol and dissolving the purified hormone in physiologic saline.

5. The method of concentrating and purifying a testicular hormone which comprises removing the protein constituents from the testicular tissue, and extracting the testicular hormone from the residue at least once with a fat solvent, and removing the fat solvent.

6. The method as set forth in claim 5, in which the fat solvent is an immiscible liquid.

7. The method as set forth in claim 5, in which the fat solvent is benzene.

8. The method as set forth in claim 5, in which the concentrated testicular hormone is fractionated with an additional fat solvent.

9. A potent extract from a tissue constituent, containing the testicular hormone, said extract being of a concentration of the order of that obtained by treating testicular tissue with substantially pure ethyl alcohol to coagulate the proteins and render them insoluble, removing the liquid therefrom, concentrating said liquid to an aqueous lipoid sludge, treating said sludge at least once with a fat solvent, recovering the solute dissolved by the fat solvent and successively fractionating said solute with alcohol and benzene, said extract being sufficiently free from impurities for repeated administration to animals, and having the physiological properties of producing marked effect upon the secondary sex characteristics of castrated laboratory animals.

10. A clear aqueous solution of a testicular hormone, containing no visible solids and giving no cholesterol or protein reaction, and of such strength that 2 cc. or less will produce observable sex reactions in a castrated rat, and produced by extracting fresh testicle with a water miscible lipoid and hormone solvent, distilling the solvent leaving the hormone in an aqueous lipoid solution, extracting the hormone from the aqueous lipoid solution at least once with a water immiscible fat solvent, washing with dilute alkali, distilling off the fat solvent, redissolving in a water immiscible fat solvent and separating the hormone from the associated fats and oils by saponification, removing the solvent and dissolving the hormone in water for injection.

FRANK R. ELDRED.

CERTIFICATE OF CORRECTION.

Patent No. 1,978,297.

October 23, 1934.

FRANK R. ELDRED.

It is hereby certified that error appears in the printed specification of the above numbered patent requiring correction as follows: Page 2, line 90, for "10" read 100; and that the said Letters Patent should be read with this correction therein that the same may conform to the record of the case in the Patent Office.

Signed and sealed this 12th day of March, A. D. 1935.

(Seal)

Leslie Frazer

Acting Commissioner of Patents.